(12) United States Patent
Miyoshi et al.

(10) Patent No.: US 12,388,340 B2
(45) Date of Patent: Aug. 12, 2025

(54) BEARINGLESS MOTOR

(71) Applicant: Mitsubishi Electric Corporation, Tokyo (JP)

(72) Inventors: Masahito Miyoshi, Tokyo (JP); Yusuke Sakamoto, Tokyo (JP); Shinichi Furutani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 91 days.

(21) Appl. No.: 18/278,004

(22) PCT Filed: Apr. 21, 2021

(86) PCT No.: PCT/JP2021/016200
§ 371 (c)(1),
(2) Date: Aug. 21, 2023

(87) PCT Pub. No.: WO2022/224381
PCT Pub. Date: Oct. 27, 2022

(65) Prior Publication Data
US 2024/0136906 A1 Apr. 25, 2024
US 2024/0235357 A9 Jul. 11, 2024

(51) Int. Cl.
*H02K 41/06* (2006.01)
*H02K 11/21* (2016.01)

(52) U.S. Cl.
CPC ......... *H02K 41/065* (2013.01); *H02K 11/21* (2016.01)

(58) Field of Classification Search
CPC .. H02K 41/065; H02K 11/21; H02K 2201/18; H02K 7/09; H02K 11/33; F16C 32/0453; F16C 32/0493; H02P 6/10; H02P 23/04; H02P 25/022
See application file for complete search history.

(56) References Cited

U.S. PATENT DOCUMENTS 8,729,758 B2 5/2014 Nussbaumer
2007/0296367 A1* 12/2007 Buhler ................ F16C 32/0442
417/423.4

FOREIGN PATENT DOCUMENTS

JP H04-300417 A 10/1992
JP 2008048560 A * 2/2008
WO WO-2019216080 A1 * 11/2019 .............. F25B 1/053

OTHER PUBLICATIONS

WO-2019216080-A1_translate (Year: 2019).*
JP-2008048560-A_translate (Year: 2008).*
(Continued)

*Primary Examiner* — Tulsidas C Patel
*Assistant Examiner* — Mohammed Ahmed Qureshi
(74) *Attorney, Agent, or Firm* — XSENSUS LLP (57) ABSTRACT

A bearingless motor includes a rotor, a stator for applying support force and torque to the rotor, and a first displacement sensor and a second displacement sensor for detecting a radial position of the rotor. The stator includes a motor winding for generating a magnetic flux having p poles to produce the torque, and a support winding for generating a magnetic flux having p±2 poles or two poles to produce the support force. The first displacement sensor and the second displacement sensor are disposed at positions axially different from each other.

8 Claims, 6 Drawing Sheets

(56) References Cited

OTHER PUBLICATIONS

Sugimoto et al., "Stability Consideration of Magnetic Suspension in Two-Axis Actively Positioned Bearingless Motor With Collocation Problem", IEEE Transactions on Industry Applications, vol. 50, No. 1, Jan./Feb. 2014, pp. 338-345.
International Search Report and Written Opinion mailed on Jul. 20, 2021, received for PCT Application PCT/JP2021/016200, filed on Apr. 21, 2021, 8 pages including English Translation.

* cited by examiner

BEARINGLESS MOTOR

CROSS-REFERENCE TO RELATED APPLICATION

The present application is based on PCT filing PCT/JP2021/016200, filed Apr. 21, 2021, the entire contents of which are incorporated herein by reference.

FIELD

The present disclosure relates to a bearingless motor, which rotates a rotor while contactlessly supporting the rotor by magnetic suspension of the rotor.

BACKGROUND

A bearingless motor has, in a single magnetic circuit, a capability of a motor to produce torque and a capability of magnetic bearing to produce support force for contactlessly suspending the rotor. Suspension of a rotor requires active control in all of five degrees of freedom other than the rotational axis, or a passive and stable structure without active control in one or some of these five degrees of freedom.

A bearingless motor of a two-axis control type detects a position by a sensor and adjusts support force to bring the detected position coincident with a target position only in the radial direction of a rotor. That is, the bearingless motor of a two-axis control type provides active control only in the radial direction. The radial direction includes two directions: an X-axis direction and a Y-axis direction.

In general, the bearingless motor of a two-axis control type does not actively control, and has a passively stable structure, in the axial direction and in a tilt direction of the rotor. The axial direction is a Z-axis direction, and the tilt direction includes $\theta_x$ and $\theta_y$. The direction to be controlled is hereinafter referred to as control direction, and a direction in passive stability under no control is hereinafter referred to as passively stable direction.

The rotor is passively stabilized by using attractive force between the permanent magnet of the rotor and the iron core of the stator. For example, tilting of the rotor causes attractive force to act between the permanent magnet of the rotor and the iron core of the stator to bring the tilted rotor back to the original position. This generates restoring torque in a direction opposite to the direction of the tilt of the rotor without control. Similarly, when the rotor moves in the axial direction, restoring force acts in a direction opposite to the direction of movement of the rotor. The attractive force to act between the permanent magnet and the iron core is proportional to the distance, and can therefore be considered as spring force. A ratio of the restoring torque to the tilt angle is hereinafter referred to as restoring torque factor $k_\theta$.

Stability in the tilt direction, i.e., in the passively stable direction, is maintained only using the restoring torque. Stability is thus lower in the tilt direction than in the control direction. The restoring torque does not act to damp oscillation. Damping force is not generated, in principle, that is to damp oscillation in proportion to the velocity in the passively stable direction. This may allow oscillation in the passively stable direction to continue or grow, and may thus destabilize the rotor.

In addition, it is reported that control in the radial direction of the bearingless motor of a two-axis control type may affect stability of the rotor in the tilt direction (see, e.g., Non Patent Literature 1). The support force of the rotor in the radial direction has a line of action not passing through the center of gravity of the rotor, and accordingly the support force in the radial direction also acts as a moment to tilt the rotor. A tilting movement may change the output of a displacement sensor for detecting a radial position. Movement and control in the radial direction are ideally independent of movement in the tilt direction, but in fact, movement in the radial direction and movement in the tilt direction interfere and couple with each other.

A method has been suggested for resolving the problem of instability caused by the foregoing interference, by a change in the position of the displacement sensor in devising the configuration (see, e.g., Patent Literature 1). To detect the position of the rotor in the tilt direction, at least 50% or more of a signal of a first displacement sensor is generated from a control zone disposed either below or above the magnetic plane of the rotor, of the measurement zone. A tilting movement brings damping force on the tilting movement via a differentiating part of a radial position controller. As a result, the radial position controller not only stabilizes the radial position but also reduces or prevents oscillation in tilting movement.

CITATION LIST

Patent Literature

Patent Literature 1: U.S. Pat. No. 8,729,758

Non Patent Literature

Non Patent Literature 1: H. Sugimoto and A. Chiba, "Stability Consideration of Magnetic Suspension in Two-Axis Actively Positioned Bearingless Motor With Collocation Problem", IEEE Transactions on Industry Applications, vol. 50, no. 1, January-February 2014, pp. 338-345

SUMMARY OF INVENTION

Problem to be Solved by the Invention

Stability of the rotor in the tilt direction is conventionally dependent only on the restoring torque proportional to the tilting amount as described above. Stability of the rotor in the tilt direction is vulnerable to disturbance. Suspension of the rotor in the radial direction and a tilting movement interfere with each other, thereby destabilizing the rotor. In a worst case, oscillation of the rotor grows divergently.

The method of Patent Literature 1 shifts the position of the displacement sensor to either below or above the magnetic plane of the rotor. The method of Patent Literature 1 thus provides control to feed back, from the displacement sensor, information including information about a position of the rotor in the tilt direction, in information about the position of the rotor in the radial direction, thereby to stabilize the rotor. That is, the method of Patent Literature 1 does not distinguish information about the position in the tilt direction from information about the position in the radial direction as different state variables in detection operation. The method of Patent Literature 1 may indeed allow the radial position controller to contribute to generation of damping force in the tilt direction, but fails to early and suitably reduce or prevent oscillation in the radial direction and oscillation in the tilt direction.

At a critical velocity, at which the natural angular frequency of the rotor in the tilt direction is the same as the rotational angular velocity, periodic disturbance caused by the rotation amplifies the oscillation of the rotor in the tilt direction. The magnitude of oscillation is thus prone to increase significantly. A similar problem also arises when the natural angular frequency in the tilt direction is the same as a multiple of the rotational angular velocity. Accordingly, when oscillation cannot be suitably reduced or prevented, the rotor is difficult to continue rotation at a rotational velocity at which the natural angular frequency in the tilt direction is the same as the rotational angular velocity, or rotation at a rotational velocity at which the natural angular frequency in the tilt direction is the same as a multiple of the rotational angular velocity.

The present disclosure has been made in view of the foregoing, and it is an object of the present disclosure to provide a bearingless motor that improves stability of the rotor in the tilt direction.

Means to Solve the Problem

To solve the problem and achieve the object described above, a bearingless motor according to the present disclosure is a bearingless motor of a two-axis control type, and includes a rotor, a stator for applying support force and torque to the rotor, a first displacement sensor and a second displacement sensor for detecting a radial position of the rotor, a computing unit that computes a displacement of the rotor in a tilt direction based on detection results obtained by the first displacement sensor and by the second displacement sensor, and a tilt-directional position controller that receives the displacement in the tilt direction obtained by the computing unit, removes at least part of a band not including a natural angular frequency of tilting of the rotor, and outputs a current command. The stator includes a motor winding for generating a magnetic flux having p poles to produce the torque, and a support winding for generating a magnetic flux having p±2 poles or two poles to produce the support force. At least part of a magnetic circuit having the magnetic flux having p poles for producing the torque and at least part of a magnetic circuit having the magnetic flux having p±2 poles or two poles for producing the support force are common to each other. The support force is produced by superimposition of the magnetic flux having p±2 poles or two poles on the magnetic flux having p poles. The above p represents a natural number. The first displacement sensor and the second displacement sensor are disposed at positions axially different from each other.

Effects of the Invention

A bearingless motor according to the present disclosure is advantageous in capability of improving stability of the rotor in the tilt direction.

DESCRIPTION OF EMBODIMENTS

A bearingless motor according to embodiments will be described in detail below with reference to the drawings.

First Embodiment

Figure 1:
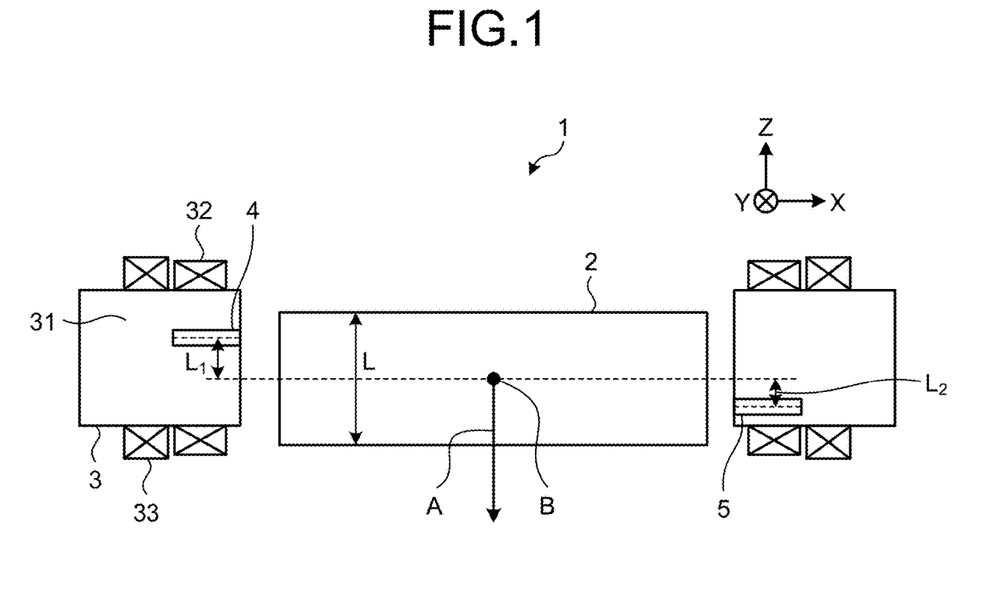
FIG. 1 is a cross-sectional view of a bearingless motor according to a first embodiment.

FIG. 1 is a cross-sectional view of a bearingless motor 1 according to a first embodiment. FIG. 1 also illustrates X-axis, Y-axis, and Z-axis. X-axis is perpendicular to Y-axis and Z-axis. Y-axis is perpendicular to Z-axis. FIG. 1 illustrates a cross section of the bearingless motor 1 in a plane parallel to the plane including X-axis and Z-axis.

The bearingless motor 1 is a bearingless motor of a two-axis control type. The bearingless motor 1 includes a rotor 2 and a stator 3 for applying support force and torque to the rotor 2. The stator 3 includes a stator iron core 31 having slots thereon. The stator 3 further includes a motor winding 32 and a support winding 33 each arranged in a slot formed on the stator iron core 31. The motor winding 32 generates a magnetic flux having p poles to produce torque, where p is a natural number. Causing a current to flow through the motor winding 32 causes the magnetic flux having p poles to be generated, and thus causes the torque to be produced.

The support winding 33 generates a magnetic flux having p±2 poles or two poles to produce support force. Causing a current to flow through the support winding 33 causes a magnetic flux having p±2 poles or two poles to be generated, and thus causes support force of the rotor 2 in the radial direction to be produced. For example, the support force is produced by a magnetic field having p±2 poles caused by the support winding in a case of a commonly used motor including a surface magnet-type motor, while the support force is produced by a magnetic field having two poles caused by the support winding in a case of a consequent pole motor or a homopolar motor.

At least part of the magnetic circuit having the magnetic flux having p poles for producing torque and at least part of the magnetic circuit having the magnetic flux having p±2 poles or two poles for producing support force are common to each other. The support force is produced by superimposition of the magnetic flux having p±2 poles or two poles on the magnetic flux having p poles. At least parts of the two magnetic circuits are common to each other as described above, and superimposition of the magnetic flux having p±2 poles or two poles on the magnetic flux having p poles thus causes coarse and dense portions to be generated in the magnetic flux density. Thus, adjustment of the magnitude and the phase of the support current enables control of the magnitude and the direction of the support force of the rotor 2 in the radial direction.

The rotor 2 has a deadweight A thereof acting in the downward direction, which is cancelled by restoring force by the stator 3 in the axially upward direction, thereby causing the rotor 2 to suspend at a position in balance between the deadweight A and the restoring force. A position "x" of the rotor 2 in the X-axis direction is detected using a displacement sensor. The displacement sensor may be an eddy current sensor or an optical sensor.

Detection of the position of the rotor 2 in the X-axis direction requires at least one displacement sensor. The bearingless motor 1 includes two displacement sensors, i.e., a first displacement sensor 4 and a second displacement sensor 5. The first displacement sensor 4 and the second displacement sensor 5 each detect the position of the rotor 2 in the radial direction. The first displacement sensor 4 and the second displacement sensor 5 are disposed at positions axially different from each other of the rotor 2. In the first embodiment, the second displacement sensor 5 is disposed at a position circumferentially different from the position of the first displacement sensor 4 by a mechanical angle of 0°. The second displacement sensor 5 may be disposed at a position circumferentially different from the position of the first displacement sensor 4 by a mechanical angle of 180°.

Figure 2:
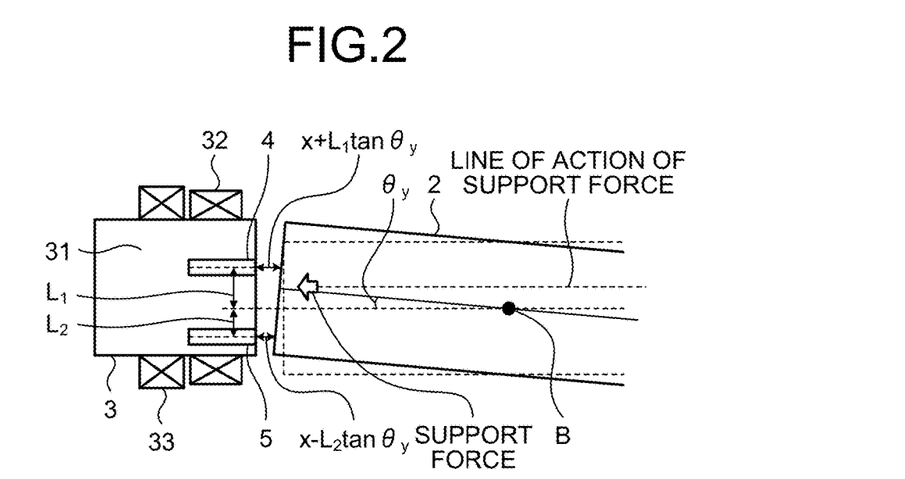
FIG. 2 is a cross-sectional view of the bearingless motor according to the first embodiment when a second displacement sensor is disposed at an angular position identical to the angular position of a first displacement sensor.

FIG. 2 is a cross-sectional view of the bearingless motor 1 according to the first embodiment when the second displacement sensor 5 is disposed at an angular position identical to the angular position of the first displacement sensor 4. FIG. 2 illustrates a cross section of the bearingless motor 1 in a plane parallel to the plane including X-axis and Z-axis. In FIG. 2, the second displacement sensor 5 is disposed at a position circumferentially different from the position of the first displacement sensor 4 by a mechanical angle of 180°. The following description describes signals of the displacement sensors when the second displacement sensor 5 is disposed at a position circumferentially different from the position of the first displacement sensor 4 by a mechanical angle of 180°. The case of FIG. 1 can be addressed by inverting the sign of the signal of the second displacement sensor 5 in formulae representing the case of FIG. 2.

Let $L_1$ denote the axial position of the first displacement sensor 4, and $L_2$ denote the axial position of the second displacement sensor 5, with respect to a center of gravity B of the rotor 2. Note that "L" of FIG. 1 represents the stack length of the rotor 2. A surface of the rotor 2 serves as the sensor target. Movement of the rotor 2 along the X-axis direction causes a change in the distance between that the surface of the rotor 2 and the displacement sensor. An inclination $\theta_y$ of the rotor 2 about Y-axis also causes a change in the distance between that the surface of the rotor 2 and the displacement sensor. A signal $x_1$ of the first displacement sensor 4 is expressed by Formula (1) below. A signal $x_2$ of the second displacement sensor 5 is expressed by Formula (2) below.

Formula 1:

$$x_1 = x + L_1 \tan \theta_y \approx x + L_1 \theta_y \quad (1)$$

Formula 2:

$$x_2 = x - L_2 \tan \theta_y \approx x - L_2 \theta_y \quad (2)$$

FIG. 2 illustrates a case in which the center of gravity B of the rotor 2 is positioned between the first displacement sensor 4 and the second displacement sensor 5. When the center of gravity B is positioned below the second displacement sensor 5, such configuration can be addressed by inverting the sign of the axial position $L_2$ of the second displacement sensor 5. The symbol $L_2$ represents the distance between the center of gravity B and the axial position of the second displacement sensor 5.

The bearingless motor 1 can obtain information about the position x in the X-axis direction and information about the inclination $\theta_y$ about Y-axis, of the rotor 2, by use of both the signal $x_1$ of the first displacement sensor 4 and the signal $x_2$ of the second displacement sensor 5. The position x of the rotor 2 in the X-axis direction is expressed by Formula (3) below, and the inclination $\theta_y$ about Y-axis is expressed by Formula (4) below.

Formula 3:

$$x \approx (L_2 x_1 + L_1 x_2)/(L_1 + L_2) \quad (3)$$

Formula 4:

$$\theta_y \approx (x_1 - x_2)/(L_1 + L_2) \quad (4)$$

The stack length L of the rotor 2 is less than or equal to the radius of the rotor 2. That is, the rotor 2 has a flat structure.

A displacement of the rotor 2 in the axial direction or in the tilt direction causes restoring force and restoring torque to be produced to cancel the displacement. That is, positive spring force is produced, and the force acts to cause the rotor 2 to be passively stabilized in the axial direction and in the tilt direction. However, in other words, there is a limitation that the stack length L of the rotor 2 is not allowed to be greater than the radius of the rotor 2.

The inclination $\theta_y$ of the rotor 2 about Y-axis is calculated by division of the difference $x_1 - x_2$ between the signal $x_1$ of the first displacement sensor 4 and the signal $x_2$ of the second displacement sensor 5 by the axial distance $L_1 + L_2$ between the first displacement sensor 4 and the second displacement sensor 5. The difference $x_1 - x_2$ is proportional to the magnitude of the distance $L_1 + L_2$. However, the distance $L_1 + L_2$ is not allowed to exceed the stack length L of the flat rotor 2.

When the rotor 2, serving as the target of each of the displacement sensors, moves in the axial direction or in the tilt direction to cause the rotor 2 to fall outside a part of the detection range of one of the displacement sensors, an error may occur in the detection value of that displacement sensor. Oscillation of the rotor 2 in the axial direction or in the tilt direction, or constant sinking of the rotor 2 due to the deadweight A, also causes a change in the positions of the top end and of the bottom end of the rotor 2. To avoid the effect of such phenomenon, the distance $L_1+L_2$ needs to be less than the stack length L of the rotor 2.

Let $\Delta z$ denote the amplitude of axial variation of the top end and the bottom end of the rotor 2 due to oscillation or sinking of the rotor 2, and D denote the outer diameter of each displacement sensor. When eddy current sensors are used, the displacement sensors need to be disposed between the axial positions of the top end and of the bottom end of the rotor 2, which is the measurement target of the displacement sensors. The detection range used by each sensor is assumed to be a circle having an outer diameter that is three times the sensor outer diameter D, that is, a circle having a radius that is 3/2 times the diameter D. Therefore, both the distance between the top end of the rotor and the center of each displacement sensor, and the distance between the bottom end of the rotor and the center of each displacement sensor are desirably greater than or equal to 3/2 times the diameter D, and moreover, in view of oscillation of the measurement target, the axial distance $L_1+L_2$ between the first displacement sensor 4 and the second displacement sensor 5 needs to satisfy Formula (5) below.

Formula 5:

$$L_1+L_2 < L-2\Delta z-3D \quad (5)$$

This results in a reduced magnitude of the signal of the difference $x_1-x_2$ between the signal $x_1$ of the first displacement sensor 4 and the signal $x_2$ of the second displacement sensor 5. This then presents a problem of relatively large magnitude of disturbance or noise that is to be included during computation of the inclination $\theta_y$ of the rotor 2 about Y-axis.

Figure 3:
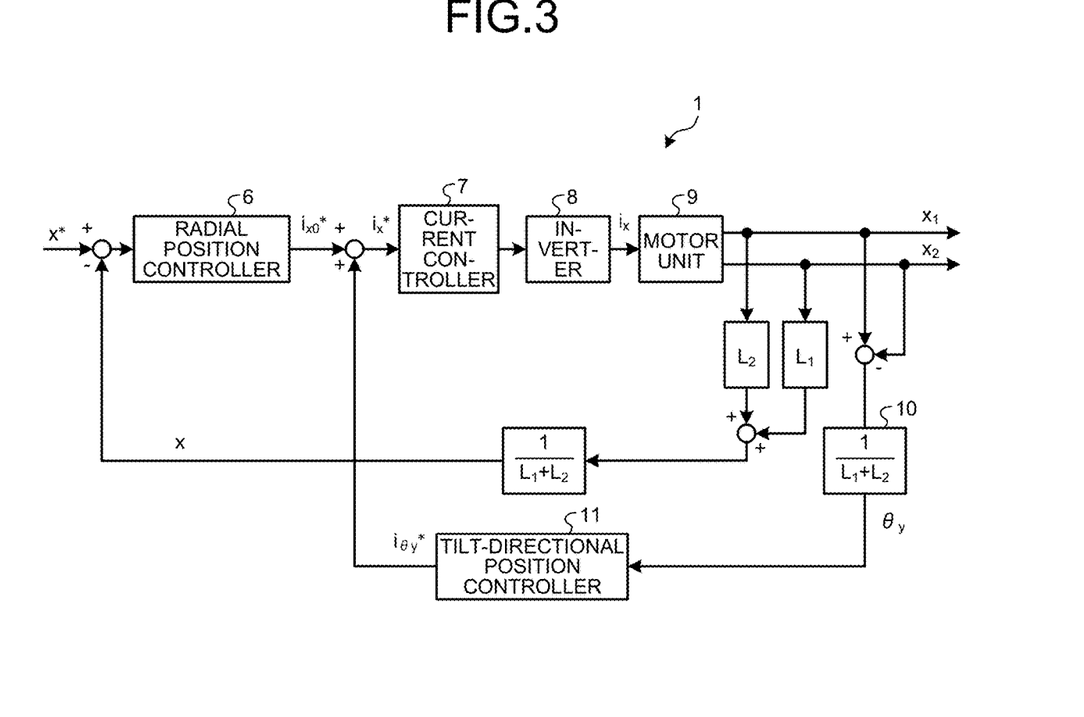
FIG. 3 is a block diagram including components for providing control of supporting the rotor using a radial position detected and a tilt direction in the first embodiment.

FIG. 3 is a block diagram including components for providing control of supporting the rotor 2 using the radial position detected and the tilt direction in the first embodiment. A deviation is calculated from the difference between a command value x* and a detection value x in the radial direction. The detection value x is the position x of the rotor 2 in the X-axis direction. The bearingless motor 1 includes a radial position controller 6, which outputs, based on the deviation, a command value $i_{x0}$* with respect to the support current for supporting the rotor 2 in the radial direction. The radial position controller 6 inputs the command value $i_{x0}$* to a current controller 7. The current controller 7 outputs a voltage command value. An inverter 8 applies a voltage to a motor unit 9 based on a signal of the voltage command value, which causes a current to flow through the motor unit 9. The motor unit 9 includes the rotor 2 and the stator 3. The bearingless motor 1 provides control of supporting the rotor 2 in the radial direction, and also utilizes displacement in the tilt direction.

The bearingless motor 1 further includes a computing unit 10, which computes the inclination $\theta_y$ of the rotor 2 about Y-axis based on detection results obtained by the first displacement sensor 4 and by the second displacement sensor 5, and a tilt-directional position controller 11, which receives the inclination $\theta_y$ of the rotor 2 about Y-axis obtained by the computing unit 10, removes at least part of a band not including the natural angular frequency of the tilting of the rotor 2 based on the inclination $\theta_y$, and outputs a current command $i_{\theta y}$*. The inclination $\theta_y$ of the rotor 2 about Y-axis is the displacement of the rotor 2 in the tilt direction.

This enables the bearingless motor 1 to detect information about the position of the rotor 2 in the tilt direction after removing an unwanted signal or noise. The bearingless motor 1 removes at least part of a band not including the natural angular frequency of tilting, and can thus cancel components of disturbance and noise to extract necessary inclination $\theta_y$ of the rotor 2 about Y-axis. The inclination has a major component that corresponds to oscillation at the natural angular frequency in the tilt direction. This oscillation at the natural angular frequency therefore needs to be damped. A natural angular frequency $\omega_n$ in the tilt direction is expressed by Formula (6) below.

Formula 6

$$\omega_n = \frac{I_z\omega \pm \sqrt{(I_z\omega)^2 + 4Ik_\theta}}{2I} \quad (6)$$

The factor I is the moment of inertia of the rotor 2 in the tilt direction. This tilt direction is a tilt direction about X-axis and Y-axis. The factor Iz is the moment of inertia of the rotor 2 about Z-axis. The parameter $\omega$ is the rotational angular velocity of the rotor 2, and $k_\theta$ is the restoring torque factor.

As illustrated in FIG. 2, the force generated by the support winding 33 acts as support force to move the rotor 2 primarily in the X-axis direction. This force has a line of action that does not pass through the center of gravity B, and thus also acts as torque to tilt the rotor 2 about Y-axis. The bearingless motor 1 can accordingly early and suitably reduce or prevent oscillation in the radial direction and in the tilt direction by superimposition of the current command $i_{\theta y}$* generated by the tilt-directional position controller 11 on the command value $i_{x0}$* with respect to the support current for supporting the rotor 2 in the radial direction to calculate the command value ix* with respect to the support current as the sum of $i_{x0}$* and $i_{\theta y}$*.

Similarly to the situation in which the X-axis direction and the tilt direction about Y-axis, of the rotor 2, interfere with each other as described above, the Y-axis direction and the tilt direction about X-axis, of the rotor 2, also interfere with each other. To detect also the positions in the Y-axis direction and in the tilt direction about X-axis, the bearingless motor 1 provides oscillation damping control in the Y-axis direction and in the tilt direction about X-axis using two displacement sensors, i.e., the first displacement sensor 4 and the second displacement sensor 5, and using the components illustrated in FIG. 3.

As described above, the bearingless motor 1 according to the first embodiment obtains the inclination $\theta_y$ about Y-axis and the radial position, of the rotor 2, as separate state variables, and can thus early and suitably reduce or prevent oscillation of the rotor 2 in the tilt direction and in the radial direction by the radial position controller 6 and by the tilt-directional position controller 11. This enables the bearingless motor 1 to reduce or prevent oscillation of the rotor 2, and to rotate the rotor 2 in more stable suspension even when the rotor 2 is subjected to disturbance or the rotor 2 is rotating at a critical velocity. That is, the bearingless motor 1 is capable of improving stability of the rotor 2 in the tilt direction.

Second Embodiment

Figure 4:
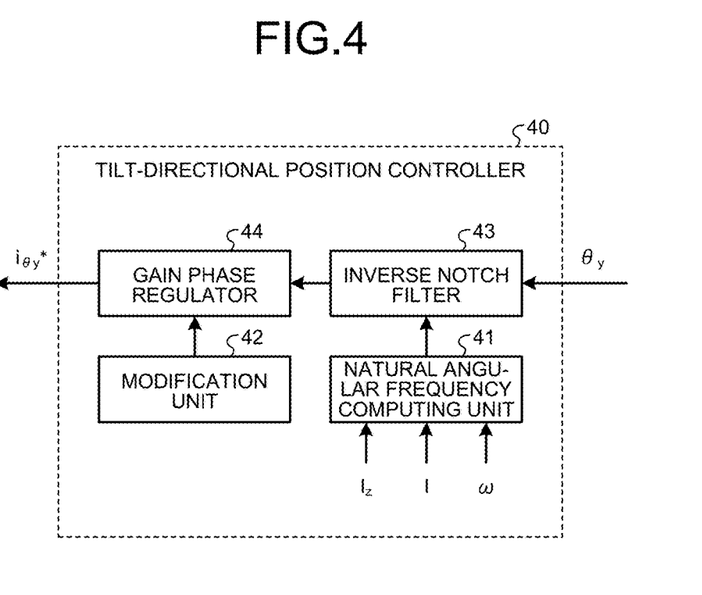
FIG. 4 is a diagram illustrating a configuration of a tilt-directional position controller that removes at least part of a band not including the natural angular frequency of tilting, and outputs a current command, in a second embodiment.

FIG. 4 is a diagram illustrating a configuration of a tilt-directional position controller 40 in a second embodiment, which removes at least part of a band not including the natural angular frequency of tilting, and outputs the current command $i_{\theta y}$*. Specifically, a configuration may be used in which the tilt-directional position controller 11 of the first embodiment has been replaced with a tilt-directional position controller 40. The tilt-directional position controller 40 includes a natural angular frequency computing unit 41, which computes the natural angular frequency using the rotational angular velocity and the moment of inertia. In the second embodiment, the computing unit 10 of the first embodiment is replaced with the natural angular frequency computing unit 41. The natural angular frequency computing unit 41 has a function to compute the natural angular frequency of the rotor 2 in the tilt direction using, as an input, at least one of the rotational velocity and the moment of inertia of the rotor 2.

The tilt-directional position controller 40 further includes a modification unit 42, which modifies the magnitude of a gain and the phase of an internal signal of the tilt-directional position controller 40. The tilt-directional position controller 40 further includes an inverse notch filter 43, which removes frequency components other than the natural angular frequency. That is, the tilt-directional position controller 40 performs filtering to pass components in a band at the natural angular frequency of the rotor 2 in the tilt direction, and remove at least part of components in a band at frequencies other than the natural angular frequency in the tilt direction. The inverse notch filter 43 has a transfer function $G_s(S)$ as expressed by Formula (7) below.

Formula 7

$$G_s(s) = \frac{a\frac{\omega_n}{Q}s}{s^2 + \frac{\omega_n}{Q}s + \omega_n^2} \quad (7)$$

In Formula (7), "a" is a coefficient for determining a gain of the inverse notch filter 43, and "Q" is a coefficient for determining the band of inverse notch.

In the second embodiment, the tilt-directional position controller 40 is capable of modifying an internal parameter to update the natural angular frequency as appropriate even when the moment of inertia or the rotational velocity has varied. This eliminates a need to change the installation positions of the displacement sensors. Note that a commonly used band-pass filter or discrete Fourier transform (DFT) may be used. DFT calculates products of a specific trigonometric function and a signal, and then averages the products.

As illustrated in FIG. 4, the tilt-directional position controller 40 further includes a gain phase regulator 44, which uses the output of the inverse notch filter 43 as an input, and regulates the gain and the phase of that input.

The bearingless motor according to the second embodiment is capable of regulating the current command $i_{\theta_y}^*$ for reducing or preventing oscillation of the rotor 2 in the tilt direction even when a change occurs in part or all of the suspension position, the center of gravity, the moment of inertia, the rotational velocity, and the angle of disposition of the entire apparatus due to a change in the configuration of the rotor 2 and in the environment around the rotor 2.

When stability is ensured by shifting the position of a displacement sensor to either below or above the magnetic plane of the rotor, such position of a displacement sensor intended for stabilization of the rotor may in fact cause instability of the rotor in the conventional technology in case of a change in the configuration of the rotor. This requires changing of the position of the displacement sensor. In the second embodiment, the modification unit 42 modifies the magnitude of the gain and the phase of a signal obtained by the gain phase regulator 44, which signal is an internal signal of the tilt-directional position controller 40. This eliminates a need to change the position of the displacement sensors. The tilt-directional position controller 40 of the second embodiment also has a function to correct a phase shift caused by the inverse notch filter 43.

The inverse notch filter 43 shifts the phase by a greater amount at a frequency farther from the center frequency. To reduce this effect, a phase lag compensator, for example, can be connected in series in the gain phase regulator 44 to provide phase correction. Alternatively, a memory may be used to temporarily store the input and lag the output with respect to the input for phase regulation.

Figure 5:
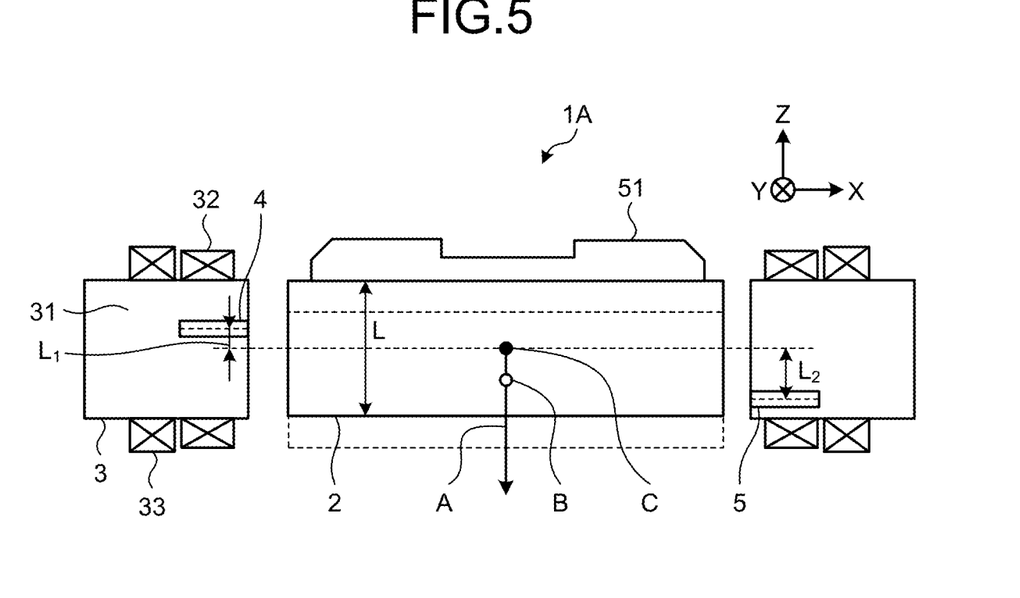
FIG. 5 is a diagram illustrating a situation in which an attachment is added onto the rotor of a bearingless motor according to the second embodiment.

FIG. 5 is a diagram illustrating a situation in which an attachment 51 is added onto the rotor 2 of a bearingless motor 1A according to the second embodiment. For example, the attachment 51 is a fan or a supporting object. Addition of the attachment 51 causes the center of gravity of the entire set of the rotor 2 and the attachment 51 to move to a center of gravity C from the center of gravity B. When the attachment 51 is a fan, reaction from the fan causes a change in thrust force, and hence a change in the suspension position of the rotor 2. When the mass and reaction of the attachment 51 have caused the center of gravity of the entire set of the rotor 2 and the attachment 51 to move to the position of the center of gravity C, use of only one displacement sensor might allow a change to occur in the effect of interference between the radial direction and the tilt direction, which might then result in instability of the rotor 2.

In contrast, the bearingless motor 1A according to the second embodiment is capable of maintaining stability of the rotor 2 without changing the positions of the displacement sensors by making adjustment in the gain phase regulator 44 even when the attachment 51 would affect the bearingless motor 1A.

Third Embodiment

Figure 6:
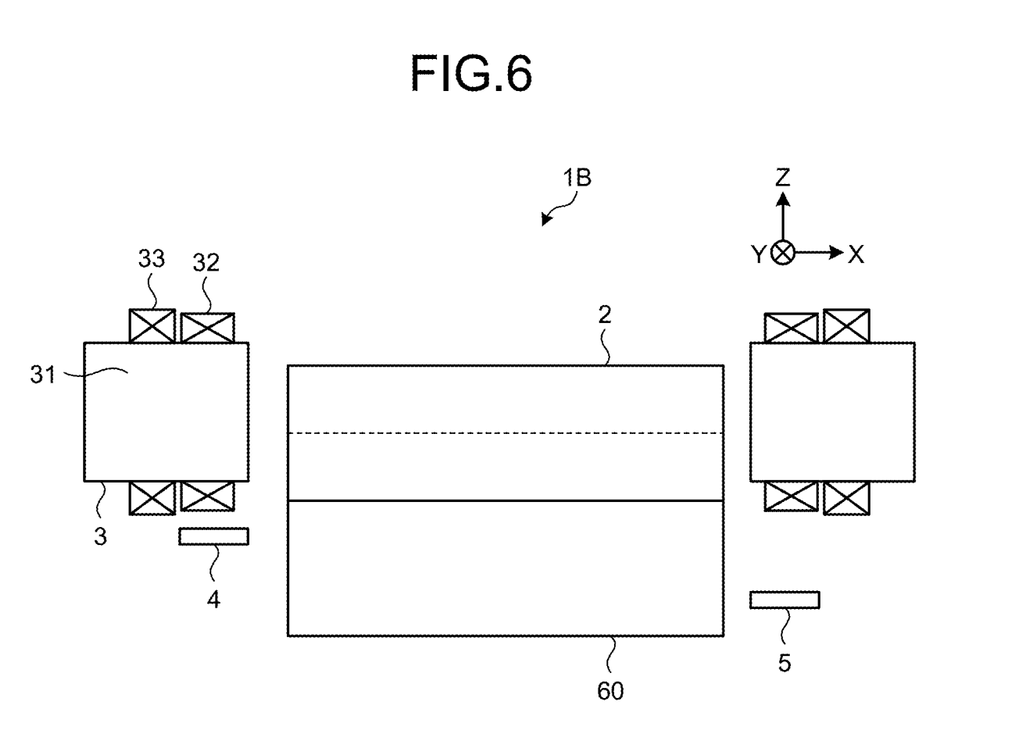
FIG. 6 is a cross-sectional view of a bearingless motor when a sensor target of a non-magnetic material has been attached to a lower portion of the rotor, in which non-magnetic material does not contribute to generation of support force or torque.
Figure 7:
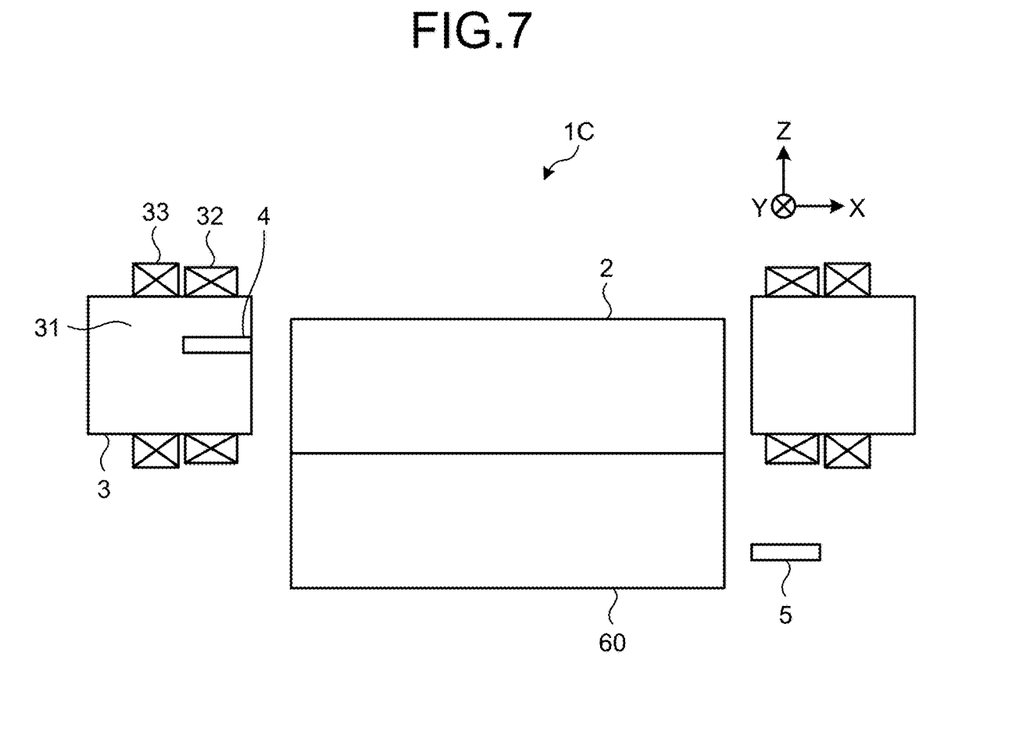
FIG. 7 is a cross-sectional view of a bearingless motor when the sensor target of a non-magnetic material has been attached to a lower portion of the rotor, in which non-magnetic material does not contribute to generation of support force or torque.
Figure 8:
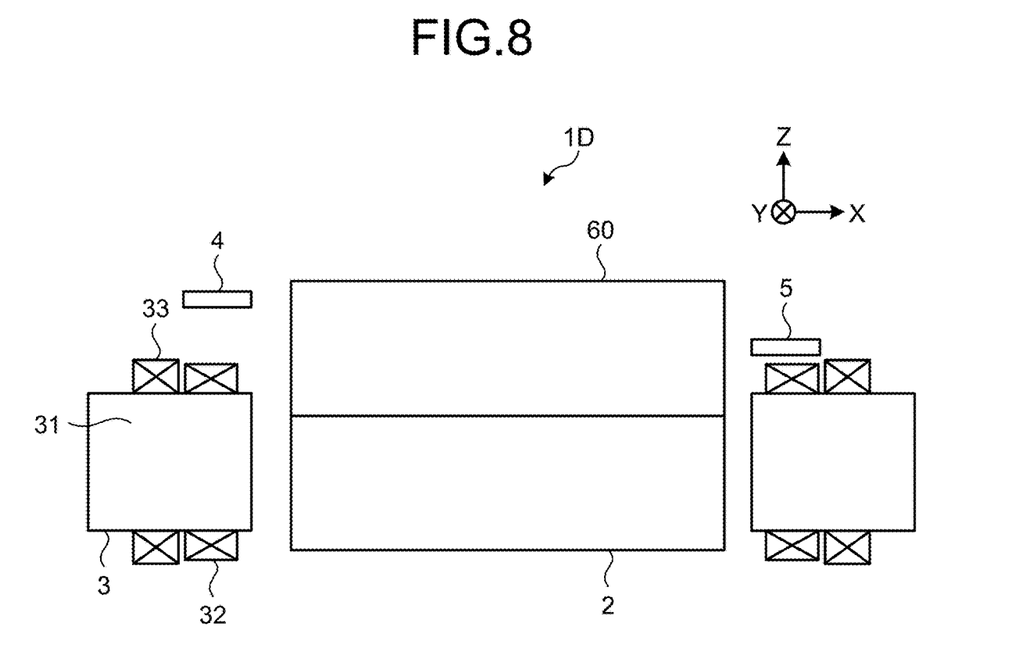
FIG. 8 is a cross-sectional view of a bearingless motor when the sensor target of a non-magnetic material has been attached to an upper portion of the rotor, in which non-magnetic material does not contribute to generation of support force or torque.
Figure 9:
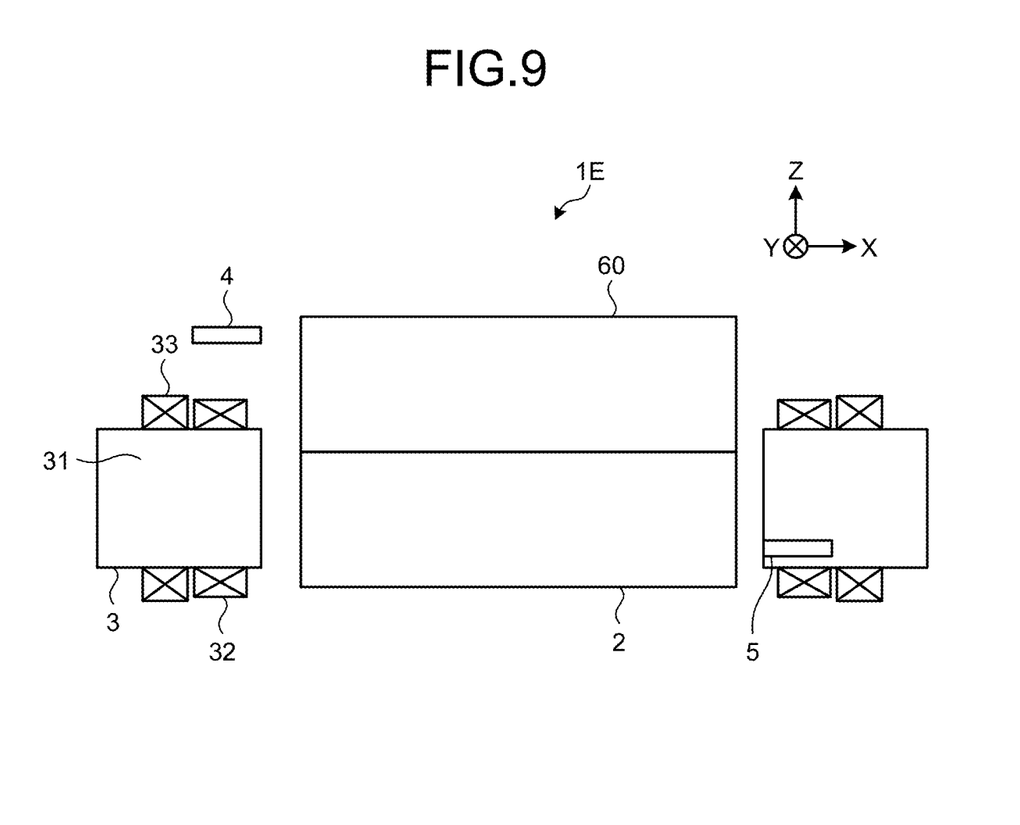
FIG. 9 is a cross-sectional view of a bearingless motor when the sensor target of a non-magnetic material has been attached to an upper portion of the rotor, in which non-magnetic material does not contribute to generation of support force or torque.

FIG. 6 is a cross-sectional view of a bearingless motor 1B when a sensor target 60 of a non-magnetic material has been attached to a lower portion of the rotor 2, in which non-magnetic material does not contribute to generation of the support force and the torque. FIG. 7 is a cross-sectional view of a bearingless motor 1C when the sensor target 60 of a non-magnetic material has been attached to a lower portion of the rotor 2, in which non-magnetic material does not contribute to generation of the support force and the torque. FIG. 8 is a cross-sectional view of a bearingless motor 1D when the sensor target 60 of a non-magnetic material has been attached to an upper portion of the rotor 2, in which non-magnetic material does not contribute to generation of the support force and the torque. FIG. 9 is a cross-sectional view of a bearingless motor 1E when the sensor target 60 of a non-magnetic material has been attached to an upper portion of the rotor 2, in which non-magnetic material does not contribute to generation of the support force and the torque. FIGS. 6 to 9 each illustrate X-axis, Y-axis, and Z-axis. FIGS. 6 to 9 illustrate cross sections of the respective bearingless motors 1B, 1C, 1D, and 1E in a plane parallel to the plane including X-axis and Z-axis.

A displacement sensor that is an eddy current sensor requires the sensor target 60 to be metal. A displacement sensor that is an optical sensor requires the sensor target 60 to be a light reflective material. In the cases of FIGS. 6 and 8, both the first displacement sensor 4 and the second displacement sensor 5 are disposed at positions outside the range between the top end and the bottom end of the stator 3. Either or both of the first displacement sensor 4 and the second displacement sensor 5 detect the position of the rotor 2 based on the sensor target 60.

In the cases of FIGS. 7 and 9, one of the first displacement sensor 4 and the second displacement sensor 5 is disposed at a position outside the range between the top end and the bottom end of the stator 3, and the other one of the first displacement sensor 4 and the second displacement sensor 5 is disposed between the top end and the bottom end of the stator 3. The foregoing one of the first displacement sensor 4 and the second displacement sensor 5 detects the position of the rotor 2 based on the sensor target 60. The foregoing other one of the first displacement sensor 4 and the second displacement sensor 5 detects the position of the rotor 2 based on the rotor 2.

The bearingless motors 1B and 1D of FIGS. 6 and 8 can detect the position of the rotor 2 based on the sensor target 60, even if a displacement sensor is difficult to be disposed, for example, in a slot, at an axial position identical to the axial position of the stator 3. The bearingless motors 1C and 1E of FIGS. 7 and 9 can use the distance $L_1+L_2$ between the first displacement sensor 4 and the second displacement sensor 5 that is greater than the stack length L of the rotor 2. This enables the bearingless motors 1C and 1E to use the difference $x_1-x_2$ between the signal $x_1$ of the first displacement sensor 4 and the signal $x_2$ of the second displacement sensor 5 that is large as compared to the magnitude of disturbance or noise.

Figure 10:
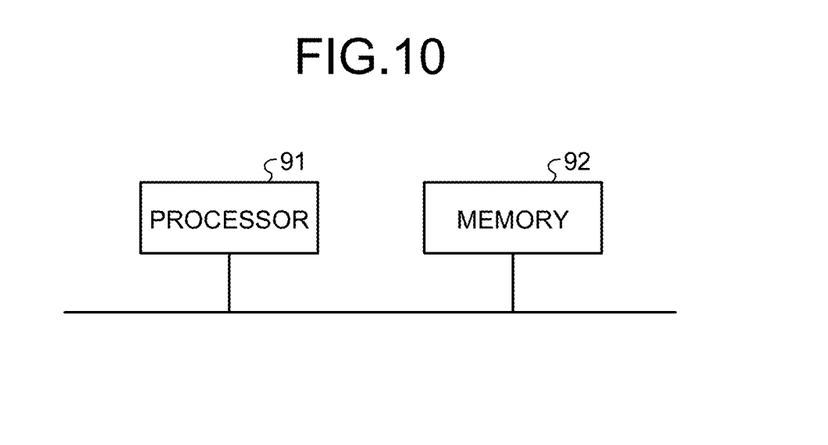
FIG. 10 is a diagram illustrating a processor when a tilt-directional position controller included in the bearingless motor according to the first embodiment is implemented in the processor.

FIG. 10 is a diagram illustrating a processor 91 when the tilt-directional position controller 11 included in the bearingless motor 1 according to the first embodiment is implemented in the processor 91. That is, functions of the tilt-directional position controller 11 may be implemented in the processor 91, which executes a program stored in a memory 92. The processor 91 is a central processing unit (CPU), a processing unit, a computing unit, a microprocessor, or a digital signal processor (DSP). FIG. 10 also illustrates the memory 92.

When the functions of the tilt-directional position controller 11 are implemented in the processor 91, the functions are implemented in the processor 91 and in software, firmware, or a combination of software and firmware. The software or firmware is described in the form of a program, and is stored in the memory 92. The processor 91 implements the functions of the tilt-directional position controller 11 by reading and executing the program stored in the memory 92.

When the functions of the tilt-directional position controller 11 are implemented in the processor 91, the bearingless motor 1 includes the memory 92 for storing a program that causes the processor 91 to perform steps to be performed by the tilt-directional position controller 11. It can also be said that the program stored in the memory 92 causes a computer to perform the tilt-directional position controller 11.

The memory 92 is, for example, a non-volatile or volatile semiconductor memory such as a random access memory (RAM), a read-only memory (ROM), a flash memory, an erasable programmable read-only memory (EPROM), or an electrically erasable programmable read-only memory (EEPROM) (registered trademark); a magnetic disk; a flexible disk; an optical disk; a compact disc; a MiniDisc; a digital versatile disk (DVD); or the like.

Figure 11:
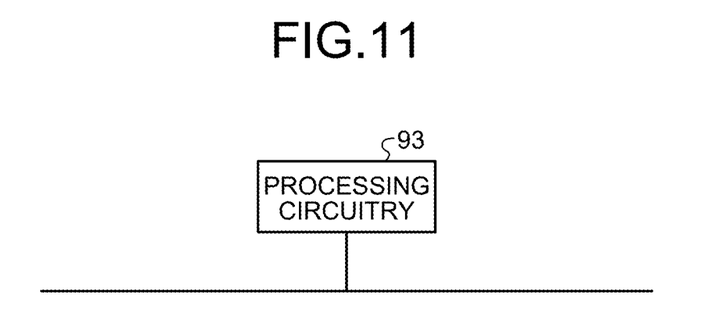
FIG. 11 is a diagram illustrating a processing circuitry when the tilt-directional position controller included in the bearingless motor according to the first embodiment is implemented in the processing circuitry.

FIG. 11 is a diagram illustrating a processing circuitry 93 when the tilt-directional position controller 11 included in the bearingless motor 1 according to the first embodiment is implemented in the processing circuitry 93. That is, the tilt-directional position controller 11 may be implemented in the processing circuitry 93. The processing circuitry 93 is dedicated hardware. The processing circuitry 93 is, for example, a single circuit, a composite circuit, a programmed processor, a parallel programmed processor, an application specific integrated circuit (ASIC), a field-programmable gate array (FPGA), or a combination thereof. Part of the tilt-directional position controller 11 may be implemented in dedicated hardware separate from the remaining part thereof.

Some of a plurality of functions of the tilt-directional position controller 11 may be implemented in software or firmware, and the other functions thereof may be implemented in dedicated hardware. As described above, the functions of the tilt-directional position controller 11 can be implemented in hardware, software, firmware, or a combination thereof.

Part or all of the radial position controller 6 included in the bearingless motor 1 according to the first embodiment may be implemented in a processor or in a processing circuitry. Part or all of the computing unit 10 included in the bearingless motor 1 according to the first embodiment may be implemented in a processor or in a processing circuitry. Such processors are each a processor similar to the processor 91. Such processing circuitries are each a processing circuitry similar to the processing circuitry 93.

Part or all of the tilt-directional position controller 40 included in the bearingless motor according to the second embodiment may be implemented in a processor or in a processing circuitry. Such processor is a processor similar to the processor 91. Such processing circuitry is a processing circuitry similar to the processing circuitry 93.

The configurations described in the foregoing embodiments are merely examples. These configurations may be combined with a known other technology, and configurations of different embodiments may be combined together. Moreover, part of such configurations may be omitted or modified without departing from the gist thereof.

REFERENCE SIGNS LIST 1, 1A, 1B, 1C, 1D, 1E bearingless motor; 2 rotor; 3 stator; 4 first displacement sensor; 5 second displacement sensor; 6 radial position controller; 7 current controller; 8 inverter; 9 motor unit; 10 computing unit; 11, 40 tilt-directional position controller; 31 stator iron core; 32 motor winding; 33 support winding; 41 natural angular frequency computing unit; 42 modification unit; 43 inverse notch filter; 44 gain phase regulator; 51 attachment; 60 sensor target; 91 processor; 92 memory; 93 processing circuitry.

The invention claimed is:

1. A bearingless motor of a two-axis control type comprising:
 a rotor;
 a stator for applying support force and torque to the rotor;
 a first displacement sensor and a second displacement sensor to detect a radial position of the rotor;
 a computing circuitry to compute a displacement of the rotor in a tilt direction based on detection results obtained by the first displacement sensor and by the second displacement sensor; and
 a tilt-directional position controller to receive the displacement in the tilt direction obtained by the computing circuitry, to remove at least part of a band not including a natural angular frequency of tilting of the rotor, and to output a current command, wherein the stator includes
- a motor winding to generate a magnetic flux having p poles to produce the torque, and
- a support winding to generate a magnetic flux having p+2 poles or two poles to produce the support force, at least part of a magnetic circuit having the magnetic flux having p poles for producing the torque and at least part of a magnetic circuit having the magnetic flux having p±2 poles or two poles for producing the support force are common to each other, the support force is produced by superimposition of the magnetic flux having p±2 poles or two poles on the magnetic flux having p poles, p representing a natural number, and the first displacement sensor and the second displacement sensor are disposed at positions axially different from each other.

2. The bearingless motor according to claim 1, wherein the tilt-directional position controller includes a modifying circuitry that modifies a magnitude of a gain and a phase of an internal signal of the tilt-directional position controller.

3. The bearingless motor according to claim 1, wherein the computing circuitry computes the natural angular frequency of the rotor in the tilt direction using, as an input, at least one of a rotational velocity or a moment of inertia of the rotor.

4. The bearingless motor according to claim 1, wherein the rotor has a stack length less than or equal to a radius of the rotor.

5. The bearingless motor according to claim 1, wherein the second displacement sensor is disposed at a position circumferentially different from a position of the first displacement sensor by a mechanical angle of 0 degrees or by a mechanical angle of 180 degrees.

6. A bearingless motor of a two-axis control type comprising:
- a rotor;
- a stator for applying support force and torque to the rotor; and
- a first displacement sensor and a second displacement sensor to detect a radial position of the rotor, wherein the stator includes
- a motor winding to generate a magnetic flux having p poles to produce the torque, and
- a support winding to generate a magnetic flux having p±2 poles or two poles to produce the support force, at least part of a magnetic circuit having the magnetic flux having p poles for producing the torque and at least part of a magnetic circuit having the magnetic flux having p±2 poles or two poles for producing the support force are common to each other, the support force is produced by superimposition of the magnetic flux having p±2 poles or two poles on the magnetic flux having p poles, p representing a natural number, the first displacement sensor and the second displacement sensor are disposed at positions axially different from each other, and when a sensor target of a non-magnetic material not contributing to generation of the torque and the support force is attached to an upper portion or to a lower portion of the rotor, either or both of the first displacement sensor and the second displacement sensor are disposed to detect the position of the rotor based on the sensor target.

7. The bearingless motor according to claim 1, wherein when a sensor target of a non-magnetic material not contributing to generation of the torque and the support force is attached to an upper portion or to a lower portion of the rotor, either or both of the first displacement sensor and the second displacement sensor are disposed to detect the position of the rotor based on the sensor target.

8. The bearingless motor according to claim 1, wherein the tilt-directional position controller performs filtering to pass a component in a band at the natural angular frequency of the rotor in the tilt direction, and to remove at least part of components in a band at frequencies other than the natural angular frequency in the tilt direction.

\* \* \* \* \*